United States Patent
Ito

(10) Patent No.: US 10,104,156 B2
(45) Date of Patent: Oct. 16, 2018

(54) OBJECT IMAGE INFORMATION MANAGEMENT SERVER, RECORDING MEDIUM, AND OBJECT IMAGE INFORMATION MANAGEMENT METHOD

(71) Applicant: FUJI XEROX CO., LTD., Tokyo (JP)

(72) Inventor: Kensuke Ito, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 101 days.

(21) Appl. No.: 15/122,526

(22) PCT Filed: Oct. 30, 2014

(86) PCT No.: PCT/JP2014/078848
§ 371 (c)(1),
(2) Date: Aug. 30, 2016

(87) PCT Pub. No.: WO2015/190009
PCT Pub. Date: Dec. 17, 2015

(65) Prior Publication Data
US 2017/0093956 A1 Mar. 30, 2017

(30) Foreign Application Priority Data
Jun. 10, 2014 (JP) .................. 2014-120044

(51) Int. Cl.
*G06F 15/16* (2006.01)
*H04L 29/08* (2006.01)
(Continued)

(52) U.S. Cl.
CPC ............ *H04L 67/06* (2013.01); *G05B 19/418* (2013.01); *G06F 17/30268* (2013.01); *G06Q 10/08* (2013.01); *H04L 67/10* (2013.01)

(58) Field of Classification Search
USPC ........................................ 709/219
See application file for complete search history.

(56) References Cited

U.S. PATENT DOCUMENTS 6,748,424 B1 * 6/2004 Usuda ............... H04L 29/06
709/217
7,751,805 B2 * 7/2010 Neven ............... G06K 9/228
455/3.01
(Continued)

FOREIGN PATENT DOCUMENTS

JP  2011-515772 A  5/2011
JP  2013-065144 A  4/2013
(Continued)

OTHER PUBLICATIONS

Junichi et al. (JP2013065144) (Year: 2013).*
(Continued)

*Primary Examiner* — Razu A Miah
(74) *Attorney, Agent, or Firm* — Oliff PLC

(57) ABSTRACT

A comparison service provider receives, from each of plural object-related information management servers, image information items representing unique patterns included in surfaces of objects and identification information items of the objects, stores the image information items and the identification information items received, receives from a user device an image information item representing the unique pattern included in the surface of the object, identifies one of the identification information items stored based on the image information item received, and transmits to the user device the identification information item identified or a related information item of the object stored in the object-related information management server as related to the identification information item identified.

5 Claims, 6 Drawing Sheets

(51) Int. Cl.
    *G05B 19/418*     (2006.01)
    *G06F 17/30*     (2006.01)
    *G06Q 10/08*     (2012.01)

(56) References Cited

U.S. PATENT DOCUMENTS

| | | | | |
|---|---|---|---|---|
| 8,131,118 | B1* | 3/2012 | Jing | G01C 21/20 382/305 |
| 8,139,250 | B2* | 3/2012 | Honda | G06F 17/30876 358/1.14 |
| 8,965,460 | B1* | 2/2015 | Rao | G06F 3/005 455/566 |
| 2002/0103765 | A1* | 8/2002 | Ohmori | G06Q 20/02 705/67 |
| 2003/0055910 | A1* | 3/2003 | Annini | H04L 29/06 709/214 |
| 2003/0069685 | A1* | 4/2003 | Rudd | H04L 29/06 701/408 |
| 2003/0101219 | A1* | 5/2003 | Kondo | H04L 29/06 709/204 |
| 2004/0019681 | A1* | 1/2004 | Nakamura | H04L 29/06 709/226 |
| 2004/0024850 | A1* | 2/2004 | Miyake | G06Q 20/04 709/219 |
| 2005/0050137 | A1* | 3/2005 | Bodin | H04L 29/06 709/200 |
| 2006/0240862 | A1* | 10/2006 | Neven | G06K 9/228 455/550.1 |
| 2009/0210517 | A1* | 8/2009 | Asami | G06Q 30/02 709/219 |
| 2009/0287837 | A1* | 11/2009 | Felsher | G06F 19/328 709/229 |
| 2010/0250712 | A1* | 9/2010 | Ellison | H04L 41/0233 709/219 |
| 2011/0066929 | A1* | 3/2011 | Karaoguz | G06F 3/0304 715/202 |
| 2011/0093109 | A1 | 4/2011 | Scheid Budzinski et al. | |
| 2013/0159021 | A1* | 6/2013 | Felsher | G06F 19/328 705/3 |
| 2013/0259320 | A1 | 10/2013 | Gotanda | |
| 2013/0339265 | A1 | 12/2013 | Ishiyama | |
| 2014/0148943 | A1 | 5/2014 | Matsunoshita | |
| 2015/0010758 | A1 | 1/2015 | Ito et al. | |

FOREIGN PATENT DOCUMENTS

| | | |
|---|---|---|
| JP | 2013-193989 A | 9/2013 |
| JP | 2013-210971 A | 10/2013 |
| WO | 2012/121166 A1 | 9/2012 |

OTHER PUBLICATIONS

Rui et al. (WO2012121166) (Year: 2012).*
Dec. 2, 2014 International Search Report issued in International Patent Application No. PCT/JP2014/078848.
Dec. 2, 2014 Written Opinion issued in International Patent Application No. PCT/JP2014/078848.
Mar. 6, 2018 Notification of Reasons for Refusal issued in Japanese Patent Application No. 2014-120044.

* cited by examiner

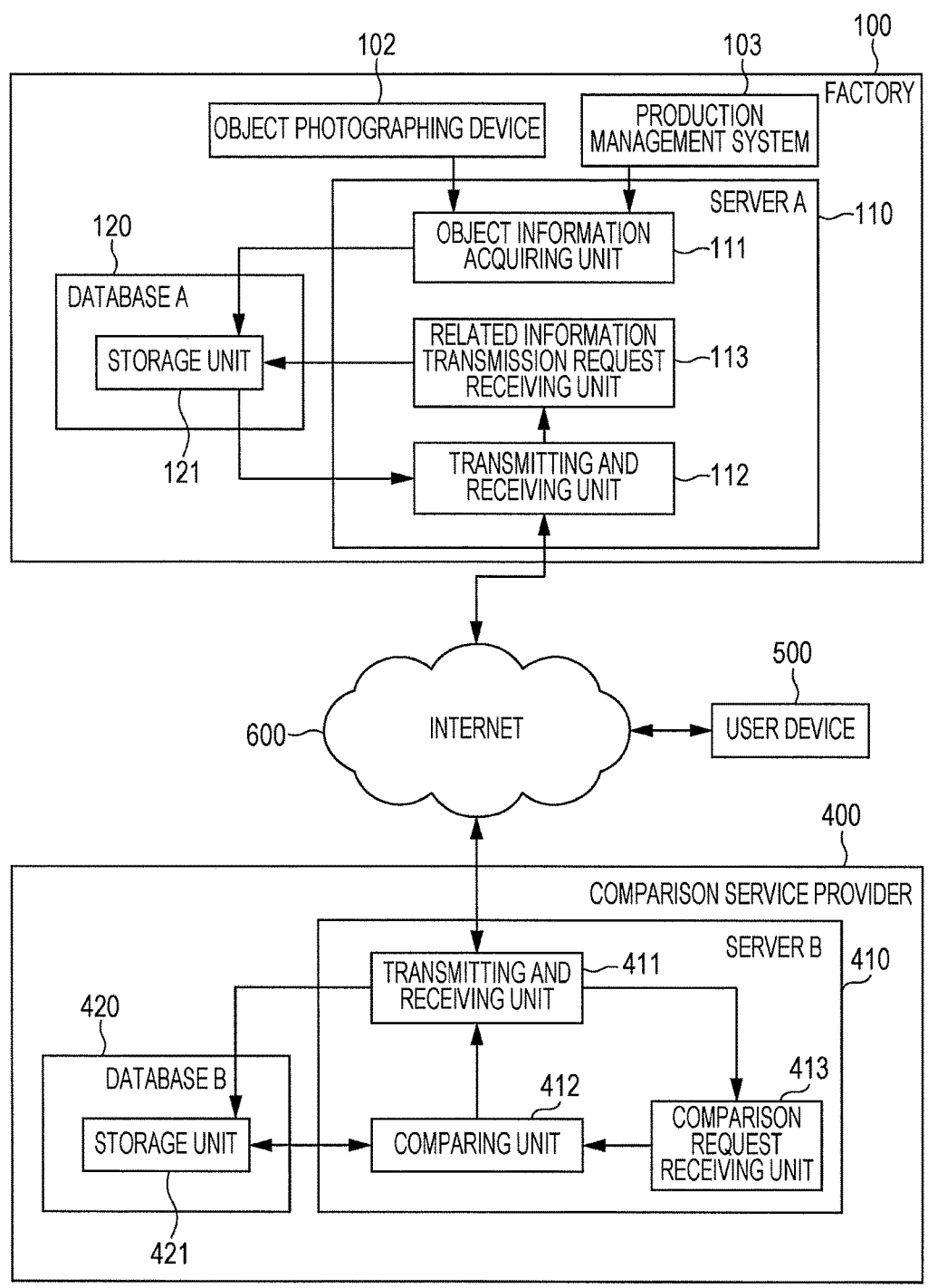

FIG. 4

| OBJECT ID | SURFACE PATTERN INFORMATION | RELATED INFORMATION | | | |
|---|---|---|---|---|---|
| | | ACQUISITION DATE AND TIME | MANUFACTURING APPARATUS IDENTIFIER | MANUFACTURING CONDITION | CONTAINER IDENTIFIER |
| 01000 | XXXX.jpg | 2014/04/25 17:40:50 | APPARATUS XX | TEMPERATURE/ HUMIDITY | CONTAINER XXX |
| 01001 | XXXX.jpg | 2014/04/25 17:41:00 | APPARATUS XX | TEMPERATURE/ HUMIDITY | CONTAINER XXX |
| 01002 | XXXX.jpg | 2014/04/25 17:41:10 | APPARATUS XX | TEMPERATURE/ HUMIDITY | CONTAINER XXX |

FIG. 5

| OBJECT ID | SURFACE PATTERN INFORMATION |
|---|---|
| 01000 | XXXX.jpg |
| 01001 | XXXX.jpg |
| 01002 | XXXX.jpg |

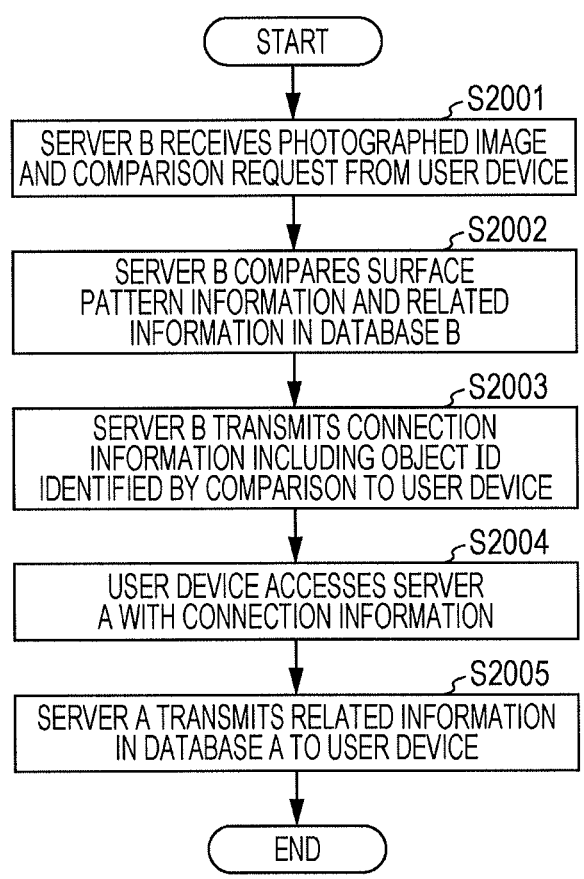

1

OBJECT IMAGE INFORMATION MANAGEMENT SERVER, RECORDING MEDIUM, AND OBJECT IMAGE INFORMATION MANAGEMENT METHOD

TECHNICAL FIELD

The present invention relates to an object image information management server, a recording medium, and an object image information management method.

BACKGROUND ART

PTL 1 described below discloses a technique for identifying, in a process of manufacturing objects such as tablets each having a unique (random) pattern on a surface thereof and storing the objects in containers, the individual objects stored in the respective containers. The technique photographs the unique patterns on the surfaces of the respective objects, acquires the times of the photographing, and stores the containers storing those objects and time ranges of storing the objects in the containers with the containers and the time ranges associated with each other, to thereby make it possible to know which one of the containers stores an individual one of the stored objects.

CITATION LIST

Patent Literature

PTL 1: Japanese Unexamined Patent Application Publication No. 2013-065144

SUMMARY OF INVENTION

Technical Problem

It is an object of the present invention to realize an object information management system in which a server that performs a process of comparing surface pattern information of objects is provided independently from a server that stores information related to the objects, to thereby provide a mechanism for collectively undertaking the comparison process for plural object manufacturers.

Solution to Problem

An invention described in claim 1 to solve the above-described problem is an object image information management server including: receiving means that receives, from each of plural object-related information management servers, image information items representing unique patterns included in surfaces of objects and identification information items of the objects; user image information receiving means that receives, from a user device, an image information item representing the unique pattern included in the surface of the object; identification information identifying means that identifies one of the identification information items received by the receiving means based on the image information item received by the user image information receiving means; and transmitting means that transmits to the user device the identification information item identified by the identification information identifying means or a related information item of the object stored in the object-related information management server as related to the identification information item identified by the identification information identifying means.

An invention described in claim 2 is the object image information management server according to claim 1, wherein the transmitting means transmits to the user device a communication control information item for the user device to transmit the identification information item identified by the identification information identifying means to the object-related information management server.

An invention described in claim 3 is the object image information management server according to claim 1, wherein the transmitting means transmits the identification information item identified by the identification information identifying means to the object-related information management server, receives the related information item stored in the object-related information management server as related to the identification information item, and transmits the received related information item to the user device.

An invention described in claim 4 is a computer readable recording medium recording a program for causing a computer to function as: receiving means that receives, from each of plural object-related information management servers, image information items representing unique patterns included in surfaces of objects and identification information items of the objects; user image information receiving means that receives, from a user device, an image information item representing the unique pattern included in the surface of the object; identification information identifying means that identifies one of the identification information items received by the receiving means based on the image information item received by the user image information receiving means; and transmitting means that transmits to the user device the identification information item identified by the identification information identifying means or a related information item of the object stored in the object-related information management server as related to the identification information item identified by the identification information identifying means.

An invention described in claim 5 is an object image information management method including: a receiving step of receiving, from each of plural object-related information management servers, image information items representing unique patterns included in surfaces of objects and identification information items of the objects; a user image information receiving step of receiving, from a user device, an image information item representing the unique pattern included in the surface of the object; an identification information identifying step of identifying one of the identification information items received in the receiving step based on the image information item received in the user image information receiving step; and a transmitting step of transmitting to the user device the identification information item identified in the identification information identifying step or a related information item of the object stored in the object-related information management server as related to the identification information item identified in the identification information identifying step.

Advantageous Effects of Invention

According to the inventions described in claims 1, 4, and 5, an object image information management server is provided which exists independently from object-related information management servers but collectively performs a process of comparing the same image information as image information of objects in the plural object-related information management servers with image information of an object transmitted by a user device.

According to the invention described in claim 2, the object image information management server transmits, to the user device having requested the comparison process, communication control information for causing related information of the object identified in the comparison process to be transmitted to the object-related information management server.

According to the invention described in claim 3, the object image information management server acquires the related information concerning the object identified in the comparison process from the object-related information management server, and transmits the related information to the user device having requested the comparison process.

BRIEF DESCRIPTION OF DRAWINGS

FIG. 3 is a functional block diagram of the object information management system according to the present invention.

FIG. 4 is a diagram illustrating an example of an object-related information table according to the present invention.

FIG. 5 is a diagram illustrating an example of an object image information table according to the present invention.

FIG. 7 is a flowchart illustrating a process of comparing an object image and so forth in the present invention.

DESCRIPTION OF EMBODIMENTS

Figure 1:
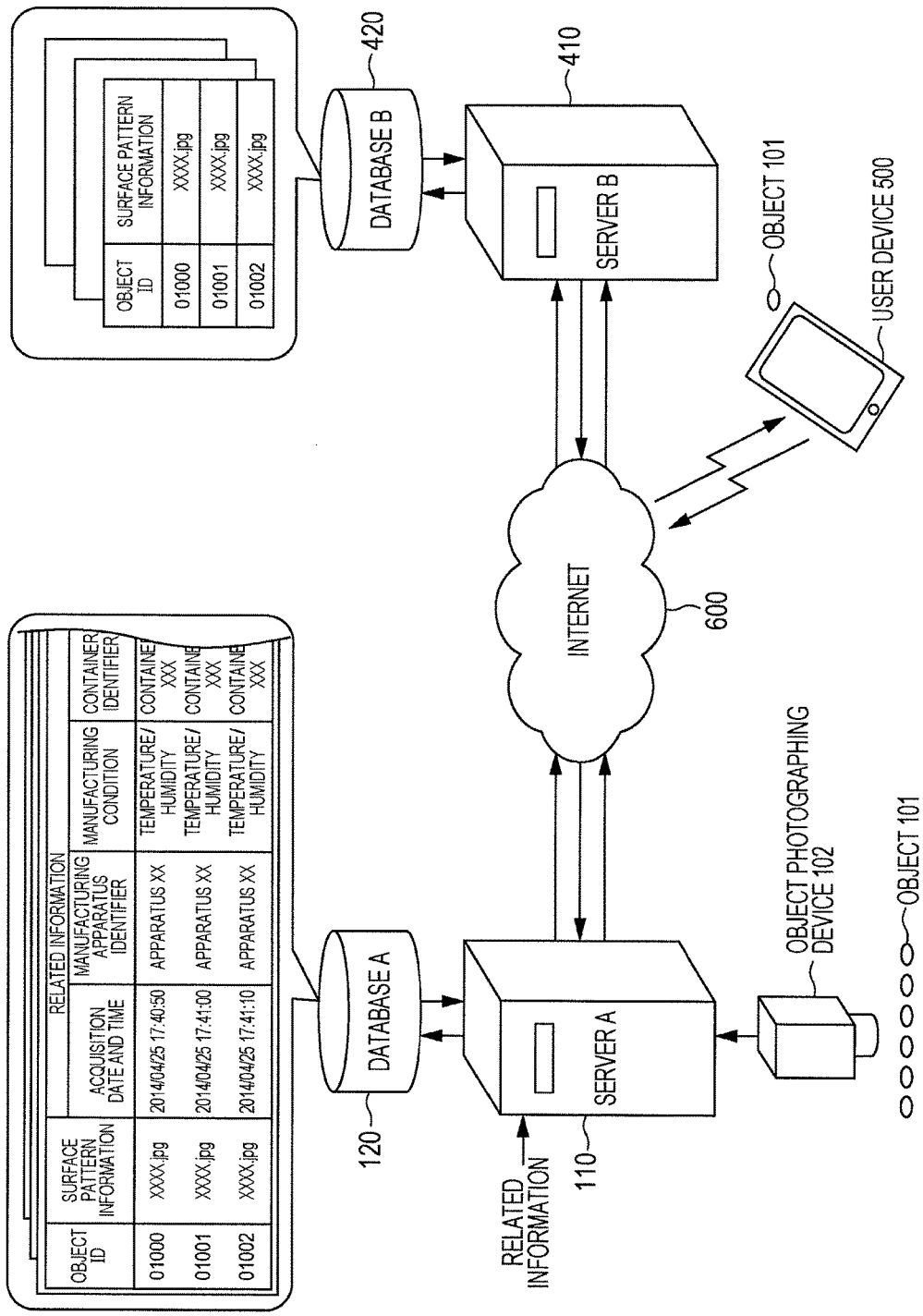
FIG. 1 is a system configuration diagram illustrating a first embodiment of an object information management system according to the present invention.

A first embodiment formed of minimum configurations for implementing the present invention will first be described in accordance with a drawing. FIG. 1 is a system configuration diagram illustrating an object information management system 1 according to the first embodiment. Firstly, the object information management system 1 includes an object photographing device 102, a server A 110, a database A 120, and so forth (illustrated on the left side in the drawing) managed by a manufacturer of objects. In addition thereto, the object information management system 1 includes a server B 410, a database B 420, and so forth (illustrated on the right side in the drawing) managed by an object comparison service provider (comparison service provider). The server A 110 and the server B 410 transmit and receive information via the Internet 600 drawn at the center in the drawing.

The object photographing device 102, which is disposed in a specific location, such as a production line, for example, in a manufacturing site of the objects, takes electronic photographs or the like of surfaces of respective objects 101 manufactured there during the manufacture, to thereby acquire surface pattern information of each of the objects 101. Specific examples of the objects 101 described herein include objects each having a unique surface pattern, such as tablets, cards, electronic components, and automobile components, for example.

The thus-acquired surface pattern information is input to the server A 110 from the object photographing device 102. In this process, a variety of related information concerning the manufacture of each of the objects 101, that is, the manufacturing date and time, manufacturing conditions such as the temperature and humidity at the time of manufacturing, IDs of the factory and the production line manufacturing the objects, and so forth is input to the server A 110 from a manufacturing apparatus or the like in the production line. The surface pattern information and the related information of the same object are both input to the database A 120, and are provided with an object ID, which is an ID unique to each of the objects. The object ID, the surface pattern information, and the related information concerning one object are stored in the database A 120 as linked to one another.

After the information of the objects is stored in the database A 120, the surface pattern information and the object IDs linked to the surface pattern information therein are transmitted from the server A 110 to the server B 410 of the comparison service provider on the right side in the drawing through the Internet 600. This transmission may be a sequential process or a batch process. The server B 410 inputs the thus-transmitted surface pattern information and object IDs to the database B 420, and the database B 420 stores these as linked to each another.

If a user, the manufacturer, a distributor, or the like of an object 101 desires comparison for the purpose of authenticity determination or tracking, a photographed image of the object acquired by the party is transmitted, together with a comparison request, to the server B 410 of the comparison service provider through the Internet 600 with the use of a user device 500, which is formed of an information terminal or the like such as a mobile phone or a smartphone.

In response to the comparison request from the user device, the server B 410 compares the surface pattern information stored in the database B 420 with the photographed image of the object transmitted from the user device 500. If surface pattern information corresponding to the photographed image is found, the server B 410 notifies the user device of the fact, and transmits to the user device 500 connection information (URL or the like) to the server A 110 including the object ID linked to the surface pattern information. If access is made to the server A 110 with this connection information, the related information linked to the object ID is transmitted to the user device 500 through the Internet 600.

Meanwhile, if the server B 410 has failed to find the corresponding surface pattern information, the server B 410 notifies the user device 500 having requested the compassion of the fact as a comparison result.

As described above, according to the present embodiment, the server that is managed by the manufacturer and stores the related information concerning the manufacture of the individual objects and the server that performs the comparison process are provided separately. Accordingly, an embodiment is realized in which the manufacturer outsources the process of comparing goods manufactured by the manufacturer.

Figure 2:
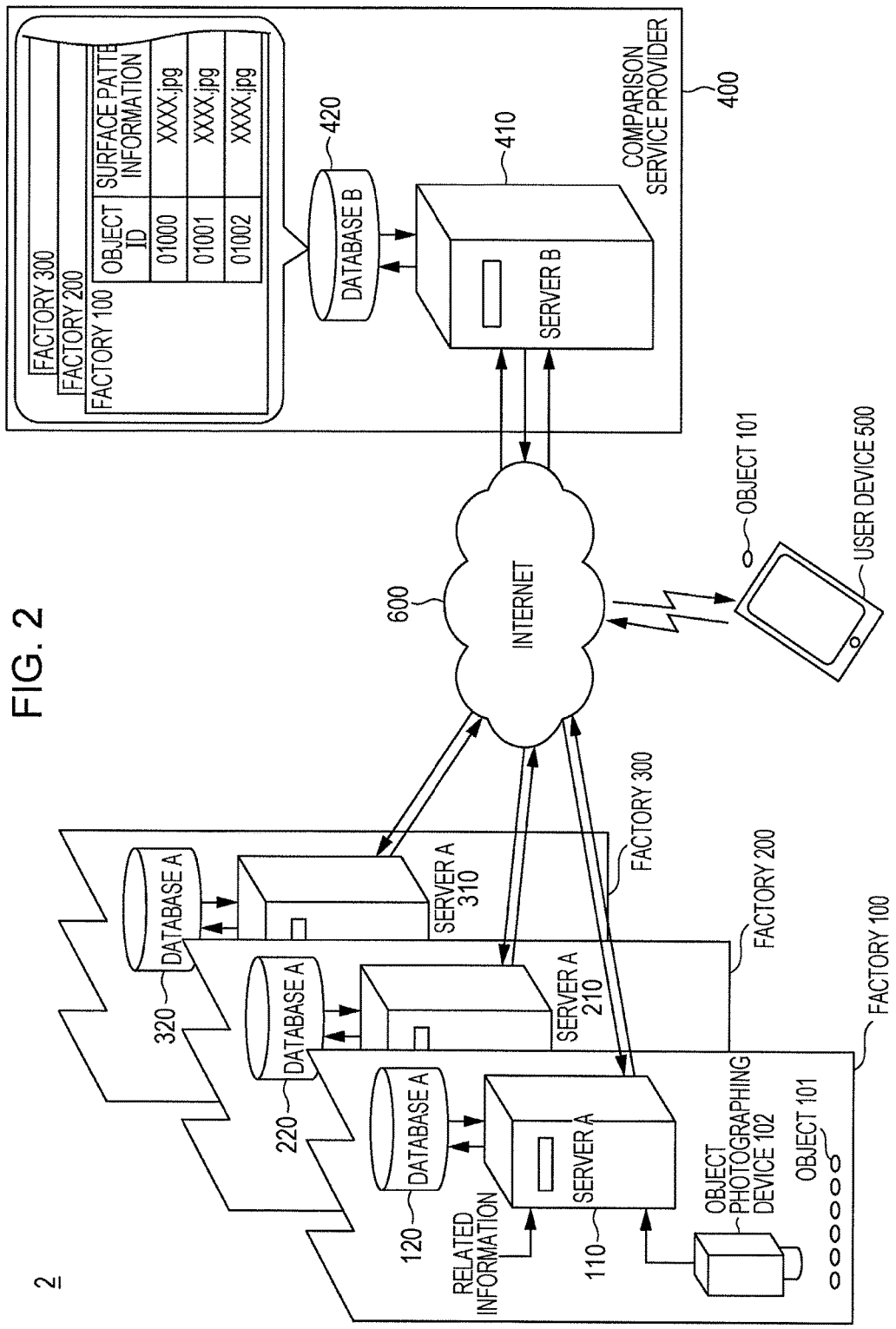
FIG. 2 is a system configuration diagram illustrating a second embodiment of the object information management system according to the present invention.

A second embodiment as an example of application of the present invention will now be described in accordance with drawings. FIG. 2 is a system configuration diagram of an object information management system 2 according to the present embodiment. It is assumed in the present embodiment that a server that performs a service of comparing goods provides the comparison service to plural manufacturers.

A basic configuration of the present embodiment is similar to the configuration of the first embodiment. However, the present embodiment is different from the first embodiment in that a single comparison service provider 400 provides the comparison service to plural object manufacturers (factories 100, 200, and 300). Although the factories are basically of different manufacturers, an embodiment is of course possible in which the comparison service is provided to each of separate factories of the same manufacturer by the single comparison service provider 400.

Each of these factories includes configurations such as the object photographing device, the server A, and the database A, which have been described as under the control of the manufacturer in the first embodiment. Herein, it suffices if the server A, the database A, and so forth are practically under the control of each factory (or each manufacturer), and are not necessarily required to be installed in the side of the factory.

The comparison service provider 400 stores and manages the surface pattern information and the IDS thereof acquired at the respective factories. That is, the comparison service provider 400 on the right side in the drawing manages the images and IDs of the objects manufactured at the respective factories 100, 200, and 300 on the left side in the drawing, and the service of comparing the objects manufactured at these factories is uniformly provided from outside these factories.

As described above, according to the present embodiment, the comparison service provider collectively manages the surface pattern information of the objects manufactured by the plural manufacturers. Accordingly, an embodiment is realized in which the process of comparing the objects manufactured by the plural manufacturers is collectively undertaken by an external party.

Details of the object information management system 2 according to the second embodiment will be described below with a functional block diagram in FIG. 3. Since the factories 200 and 300 have a configuration basically similar to the configuration of the factory 100 in terms of minimum necessary elements for the operation of the present embodiment, such as the object photographing device, the server A, and the database A (the objects manufactured by these factories are not necessarily similar), description thereof will be omitted here. The object information management system 2 is roughly divided into the factory 100, the comparison service provider 400, the user device 500, and the Internet 600 that connects these to one another. These are all illustrated in the basic configuration diagram in FIG. 2.

Functional blocks of the factory 100 will first be described. The object photographing device 102, a production management system 103, the server A 110, and the database A 120 are installed in the factory 100 as component elements of the object information management system 2. The object photographing device 102, which is a digital camera, for example, acquires the surface pattern information (electronic photographs or the like) of the objects during a production line process, and transmits the surface pattern information to an object information acquiring unit 111 of the server A 110. The production management system 103, which is a computer or the like connected to an apparatus that actually manufactures the objects, for example, transmits necessary related information concerning the manufacture of the objects 101, such as the manufacturing date and time, the temperature and humidity at the time of manufacturing, the IDs of the factory and the production line, and the IDs of containers storing the respective objects 101, to the object information acquiring unit 111 of the server A 110. It suffices if the production management system 103 has a function of transmitting the above-described necessary related information to the server A 110. Thus, the production management system 103 is not limited to any specific embodiment.

The server A 110 includes the object information acquiring unit 111, a transmitting and receiving unit 112, and a related information transmission request receiving unit 113. The functions of the above-described units included in the server A 110 may be realized as a computer including control means such as a CPU, storage means such as a hard disk or a semiconductor memory, input and output means that transmits and receives data to and from an external device, and so forth reads and executes a program stored in a computer readable information storage medium. The program may be supplied to the server A 110 formed of a computer by an information storage medium such as an optical disk, a magnetic disk, a magnetic tape, a magneto-optical disk, or a flash memory, or may be provided via a data communication network such as the Internet.

The object information acquiring unit 111 receives an input of the surface pattern information of the objects 101 from the object photographing device 102 and an input of the related information of the objects 101 from the production management system 103. These items of information are thereafter input to the database A 120 from the sever A 110.

The database A 120 includes a storage unit 121. The storage unit 121 stores data and programs. When the database A 120 receives an input of the surface pattern information and the related information of the objects 101 from the server A 110, the database A 120 provides these with object IDs, each of which is an ID unique to each of the objects 101, and stores these in the storage unit 121 as linked to each other. FIG. 4 illustrates an example of the information stored in the storage unit 121 of the database A 120.

The functions of the database A 120 may be realized as a computer including control means such as a CPU, storage means such as a hard disk or a semiconductor memory, input and output means that transmits and receives data to and from an external device, and so forth reads and executes a program stored in a computer readable information storage medium. The program may be supplied to the database A 120 formed of a computer by an information storage medium such as an optical disk, a magnetic disk, a magnetic tape, a magneto-optical disk, or a flash memory, or may be provided via a data communication network such as the Internet.

The transmitting and receiving unit 112 of the server A 110 transmits and receives information to and from the comparison service provider 400 and the user device 500 located outside the factory 100 via the Internet 600. The related information transmission request receiving unit 113 of the server A receives from the user device 500 a request for transmission of the related information of an object specified by an object ID, and requests the related information linked to the object ID from the database A. The related information is returned to the server A 110 and transmitted to the user device 500 from the transmitting and receiving unit 112 via the Internet 600.

Functional blocks of the comparison service provider 400 will now be described. The comparison service provider 400 includes the server B 410 and the database B 420.

The server B 410 includes a transmitting and receiving unit 411, a comparing unit 412, and a comparison request receiving unit 413. The functions of the above-described units included in the server B 410 may be realized as a computer including control means such as a CPU, storage means such as a memory, input and output means that transmits and receives data to and from an external device, and so forth reads and executes a program stored in a computer readable information storage medium. The program may be supplied to the server B 410 formed of a computer by an information storage medium such as an optical disk, a magnetic disk, a magnetic tape, a magneto-optical disk, or a flash memory, or may be provided via a data communication network such as the Internet.

The transmitting and receiving unit 411 of the server B 410 transmits and receives information to and from the factory 100 and the user device 500 located outside the comparison service provider 400 via the Internet 600. When the transmitting and receiving unit 411 receives the surface pattern information and the object ID of an object from the server A 110 via the Internet, the transmitting and receiving unit 411 inputs these items to the database B to be stored as linked to each other.

The database B 420 includes a storage unit 421. The storage unit 421 stores data and programs. Previously stored data, data such as the surface pattern information and the related information of the objects input from the server B 410, and so forth are stored in the storage unit 421. FIG. 5 illustrates an example of the information stored in the storage unit 421 of the database B 420.

The functions of the database B 420 may be realized as a computer including control means such as a CPU, storage means such as a hard disk or a semiconductor memory, input and output means that transmits and receives data to and from an external device, and so forth reads and executes a program stored in a computer readable information storage medium. The program may be supplied to the database B 420 formed of a computer by an information storage medium such as an optical disk, a magnetic disk, a magnetic tape, a magneto-optical disk, or a flash memory, or may be provided via a data communication network such as the Internet.

The comparison request receiving unit 413 of the server B 410 receives, together with the comparison request, the photographed image of an object transmitted to the server B 410 from the user device 500 via the Internet, and transmits the photographed image to the comparing unit 412. Upon receipt of this, the comparing unit 412 requests the surface pattern information of the object to be subjected to the comparison from the database B 420. The comparing unit 412 compares the surface pattern information received from the database B 420 with the photographed image received from the user device 500, and determines whether or not surface pattern information corresponding thereto (acquired from the same object) exists. If the corresponding surface pattern information is found, the connection information (URL or the like) to the server A 110 including the object ID linked to the surface pattern information is transmitted to the user device 500.

Figure 6:
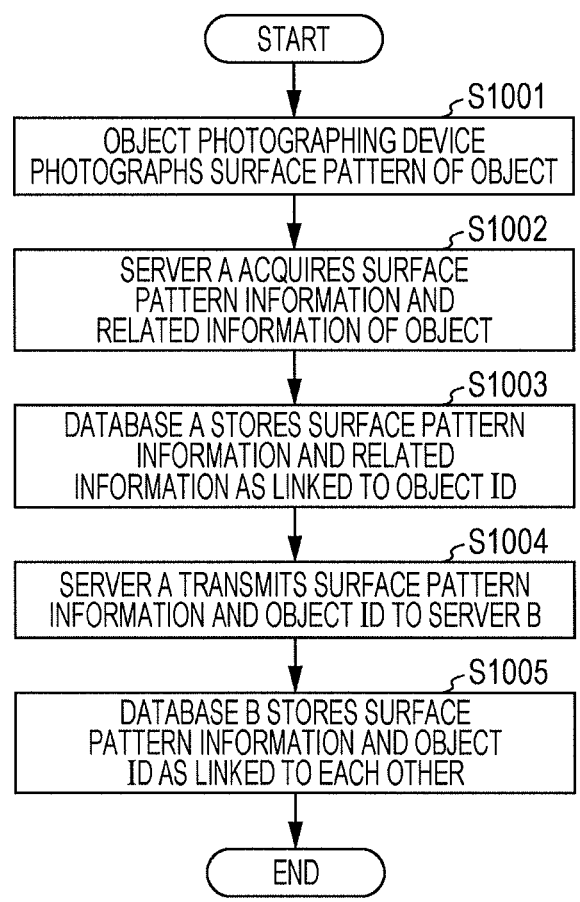
FIG. 6 is a flowchart illustrating a process of registering an object image and so forth in the present invention.

Order of processes performed in the object information management system 2 will now be described with reference to flowcharts in FIGS. 6 to 7. Firstly, FIG. 6 illustrates a flow of a storage process. As illustrated in FIG. 6, the object photographing device 102 photographs the surface of an object manufactured at the factory 100 to obtain the surface pattern information of the object (S1001). Then, the server A 110 acquires the surface pattern information and the related information concerning the manufacture of the object (S1002).

When the server A 110 inputs these surface pattern information and related information to the database A 120, the database A 120 provides these with an object ID unique to each object and stores these as linked to each another (S1003). The database A 120 returns the mutually linked object ID and surface pattern information in these information items to the server A 110, and the server A 110 transmits these to the server B 410 of the comparison service provider 400 via the Internet (S1004). The server B 410 inputs the object ID and the surface pattern information to the database B 420, and the database B 420 stores these as linked to each other (S1005).

FIG. 7 illustrates a flow of the comparison process. As illustrated in FIG. 7, the server B 410 receives the photographed image of an object to be subjected to the comparison and the comparison request from the user device 500 (S2001). The server B 410 acquires the surface pattern information and the object IDs stored in the database B 420, and executes a process of comparing the photographed image transmitted from the user device 500 with the surface pattern information (S2002). If surface pattern information corresponding to the photographed image is found, the server B 410 transmits to the user device 500 the connection information to the server A 110 including the object ID linked to the surface pattern information (S2003). Then, the user device 500 access the server A 110 with the connection information (S2004). The server A 110 acquires from the database A 120 the related information linked to the ID included in the connection information, and transmits the related information to the user device 500 (S2005).

The present invention is not limited to the foregoing embodiments. Although the foregoing embodiments are configured such that the comparison service provider 400 only manages the surface pattern information and the object IDs of the objects, an embodiment may be configured in which the comparison service provider 400 also manages other information. The name of the manufacturer manufacturing the objects, the ID of the factory manufacturing the objects, the manufacturing time of the objects, the name (trade name or the like) of the objects, or the like are conceivable as "other information." In this case, the factory transmits these additional information items to the server B 410 in addition to the surface pattern information of the objects when the objects are manufactured. Then, the database B 420 links the object IDs to the surface pattern information and these additional information items, and stores both the surface pattern information and the additional information items.

The above-described additional information serves as a limiting condition for limiting the surface pattern information of the objects to be subjected to the comparison process. In this case, if a person who desires the comparison knows information corresponding to the above-described limiting condition concerning an object to be subjected to the comparison, an embodiment is possible in which the corresponding information is transmitted from the user device 500 together with the comparison request. For example, if the purpose of the comparison is the authenticity determination of commercially available pharmaceutical tablets, the trade name of the medicine or the name of the manufacturer may be transmitted together with the comparison request. The transmission of the ID of the factory is also conceivable, depending on the situation. If such a limiting condition is a part of the related information stored in the database B 420, the server B 410 that performs the comparison process is capable of narrowing down the surface pattern information to be subjected to the comparison process in accordance with the limiting condition. Accordingly, a processing load placed on the server B 410 in the comparison process and the time taken for the process are reduced.

Further, although the foregoing embodiments are configured such that, if the surface pattern information corresponding to the photographed image is found in the comparison process by the server B 410, only the connection information including the object ID is transmitted to the user device 500, the present invention is not limited to such a configuration. A configuration may be provided in which, if the surface pattern information corresponding to the photographed image is found in the comparison process, the server B 410 causes the server A 110 to transmit the related information linked to the surface pattern information stored in the database A 120 via the Internet 600, to thereby transmit to the user device 500 the related information in place of the connection information linked to the surface pattern information together with the comparison result.

The description of embodiments may disclose the following matters.

[1] An object-related information management server including: acquiring means that acquires, for each of objects having a unique pattern in a surface thereof, an image information item representing the unique pattern and a related information item of the object; associating means that associates the related information item acquired by the acquiring means with an identification information item of the object; transmitting means that transmits the image information item acquired by the acquiring means and the identification information item to an object image information management server; and returning means that, in a case where the identification information item is received, returns the related information item of the object associated with the identification information item by the associating means.

REFERENCE SIGNS LIST 1 object information management system
2 object information management system
100 factory
101 object
102 object photographing device
103 production management system
110 server A
111 object information acquiring unit
112 transmitting and receiving unit
113 related information transmission request receiving unit
120 database A
121 storage unit
200 factory
210 server A
220 database A
300 factory
310 server A
320 database A
400 comparison service provider
410 server B
411 transmitting and receiving unit
412 comparing unit
413 comparison request receiving unit
420 database B
500 user device
600 Internet

The invention claimed is:

1. An object information management system comprising:
a plurality of object-related information management servers; and
an object image information management server,
wherein each of the plurality of object-related information management servers comprises a first processor and a first memory, the first processor being programmed to act as:

an acquisition means that acquires related information of objects respectively having unique patterns on the surface of the objects,
wherein the first memory stores the information acquired by the acquisition means in association with identification information which is unique to the each object; and
a reply means that replies the related information of the objects which is stored in association with the identification information and stored in the first memory to a user device when the identification information is received from the user device,
wherein the object image information management server comprises a second processor and a second memory, the second processor being programmed to act as:
a user image information receiving means that receives an image information from the user device;
a receiving means that receives, before the user image information receiving means receives the image information from the user device, the image information and the identification information stored in association with the image information,
wherein the second memory stores, before the user image information receiving means receives the image information from the user device, the image information and the identification information received by the receiving means;
an association means that associates the image information acquired by the user image information receiving means with an image information stored in the second memory;
an identification information identifying means that identifies one of the identification information stored in the second memory based on a result of the association means; and
a transmitting means that transmits to the user device the identification information identified by the identification information identifying means, and
wherein the transmitting means transmits the identification information identified by the identification information identifying means to one of the plurality of object-related information management servers which stores the identification information, receives the related information item stored in one of the plurality of object-related information management server as related to the identification information, and transmits the received related information item to the user device.

2. The object information management system according to claim 1, wherein the transmitting means transmits to the user device a communication control information item for the user device to transmit the identification information identified by the identification information identifying means to the object-related information management server.

3. The object information management system according to claim 1, further comprising:
a user terminal comprising a third processor and a third memory, the third processor being programmed to act as:
an identification information receiving means that receives the identification information that the transmitting means transmits;
an identification information transmitting means that transmits the received identification information to the object-related information management server; and
a related information receiving means that receives the related information of the objects stored in the object-related information management server, the object-related information management server is the server which is transmitted the identification information from the identification information transmitting means.

4. A non-transitory computer readable recording medium recording a program for causing a one or more computers to function as a plurality of first servers and a second server to perform a method, each of the plurality of first servers including a first memory, and the second server including a second memory, the method comprising:

acquiring, by each of the plurality first servers, related information of objects respectively having unique patterns on the surface of the objects;

storing, in the first memory of each of the plurality of first servers, the acquired information in association with identification information which is unique to the each object;

replying, by each of the plurality of first servers, the related information of the objects which is stored in association with the identification information and stored in the first memory to a user device when the identification information is received from the user device;

receiving, by the second server, an image information from the user device;

before second server receives the image information from the user device, receiving, by the second server, the image information and the identification information stored in association with the image information;

before receiving the image information from the user device, storing, in the second memory, the image information and the identification information received by the second server;

associating, by the second server, the image information acquired by second server with an image information stored in the second memory;

identifying, by the second server, one of the identification information stored in the second memory based on a result of the associating transmitting, by the second server, the identification information identified by the second server to the user device; and transmitting, by the second server, the identification information identified by the second server to one of the plurality of first servers which stores the identification information, receives the related information item stored in one of the plurality of first servers as related to the identification information, and transmits the received related information item to the user device.

5. An object image information management method implemented in an object information management system, the system comprising a plurality of first servers and a second server, each of the plurality of first servers including a first memory, and the second server including a second memory, the method comprising:

acquiring, by each of the plurality first servers, related information of objects respectively having unique patterns on the surface of the objects;

storing, in the first memory of each of the plurality of first servers, the acquired information in association with identification information which is unique to the each object;

replying, by each of the plurality of first servers, the related information of the objects which is stored in association with the identification information and stored in the first memory to a user device when the identification information is received from the user device;

receiving, by the second server, an image information from the user device;

before second server receives the image information from the user device, receiving, by the second server, the image information and the identification information stored in association with the image information;

before receiving the image information from the user device, storing, in the second memory, the image information and the identification information received by the second server;

associating, by the second server, the image information acquired by second server with an image information stored in the second memory;

identifying, by the second server, one of the identification information stored in the second memory based on a result of the associating;

transmitting, by the second server, the identification information identified by the second server to the user device; and transmitting the identification information identified by the second server to one of the plurality of first servers which stores the identification information, receives the related information item stored in one of the plurality of first servers as related to the identification information, and transmits the received related information item to the user device.

* * * * *